(12) United States Patent
Wang et al.

(10) Patent No.: US 6,937,443 B2
(45) Date of Patent: Aug. 30, 2005

(54) SYSTEM AND METHOD FOR A THREE-PIECE DESIGN OF A MAGNETIC HEAD ASSEMBLY

(75) Inventors: Jeffery L. Wang, Tai Po (HK); Takehiro Kamigama, Kowloon (HK); Chi Hung Yuen, Kowloon (HK); Kai Wu, Dongguan (CN)

(73) Assignee: SAE Magnetics (H.K.) Ltd., Shatin (HK)

( * ) Notice: Subject to any disclaimer, the term of this patent is extended or adjusted under 35 U.S.C. 154(b) by 390 days.

(21) Appl. No.: 10/098,067

(22) Filed: Mar. 13, 2002

(65) Prior Publication Data

US 2003/0117748 A1 Jun. 26, 2003

(30) Foreign Application Priority Data

Dec. 26, 2001 (CN) .............................. PCT/CN01/01643

(51) Int. Cl.⁷ ............................................. G11B 5/596
(52) U.S. Cl. ................. 360/265.8; 360/244.5; 360/244.7; 360/265.7; 360/265.9; 360/266.1
(58) Field of Search ........................... 360/264.2, 264.7, 360/265, 265.7, 265.8, 265.9, 266.1, 244.5, 244.7

(56) References Cited

U.S. PATENT DOCUMENTS

| | | | |
|---|---|---|---|
| 5,654,851 A | | 8/1997 | Tucker et al. ............... 360/104 |
| 5,862,019 A | * | 1/1999 | Larson ..................... 360/265.8 |
| 6,034,843 A | * | 3/2000 | Tsujino et al. ............ 360/265.8 |
| 6,061,206 A | * | 5/2000 | Foisy et al. ............... 360/265.7 |
| 6,246,534 B1 | | 6/2001 | Gillis et al. ................... 360/75 |

* cited by examiner

Primary Examiner—Robert S. Tupper
(74) Attorney, Agent, or Firm—Kenyon & Kenyon

(57) ABSTRACT

A system and method for an improved magnetic head arm assembly (HAA) is disclosed. The HAA includes three principal components, a head gimbal assembly (HGA), a flexible printed circuit (FPC) assembly, and an actuator coil assembly. The design allows for HAA rigidity, yet each of the components is designable and manufacturable independent of one another, in addition to other advantages over current methods.

8 Claims, 8 Drawing Sheets

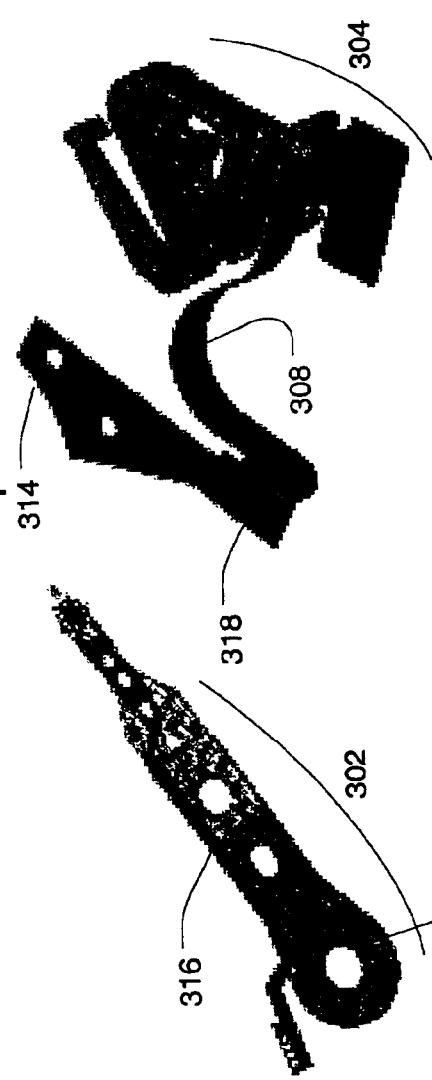
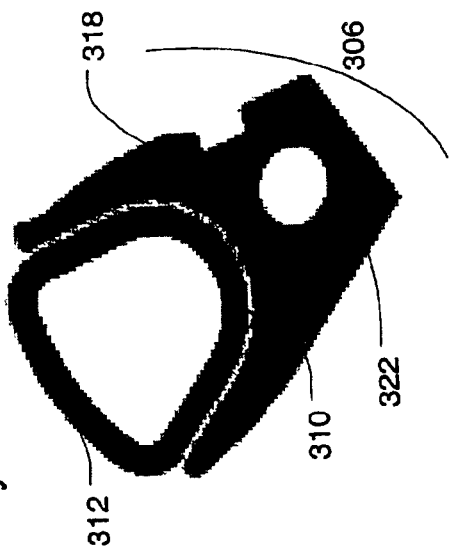
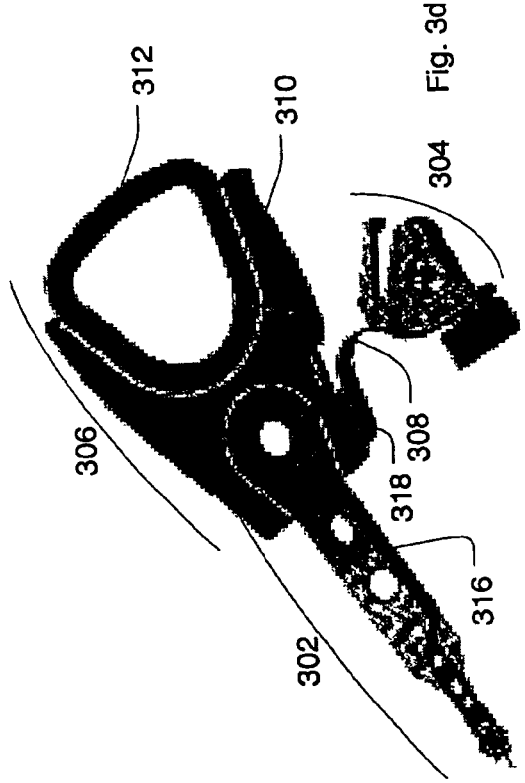
Fig. 3a  Fig. 3b  Fig. 3c  Fig. 3d
Three-piece magnetic head assembly

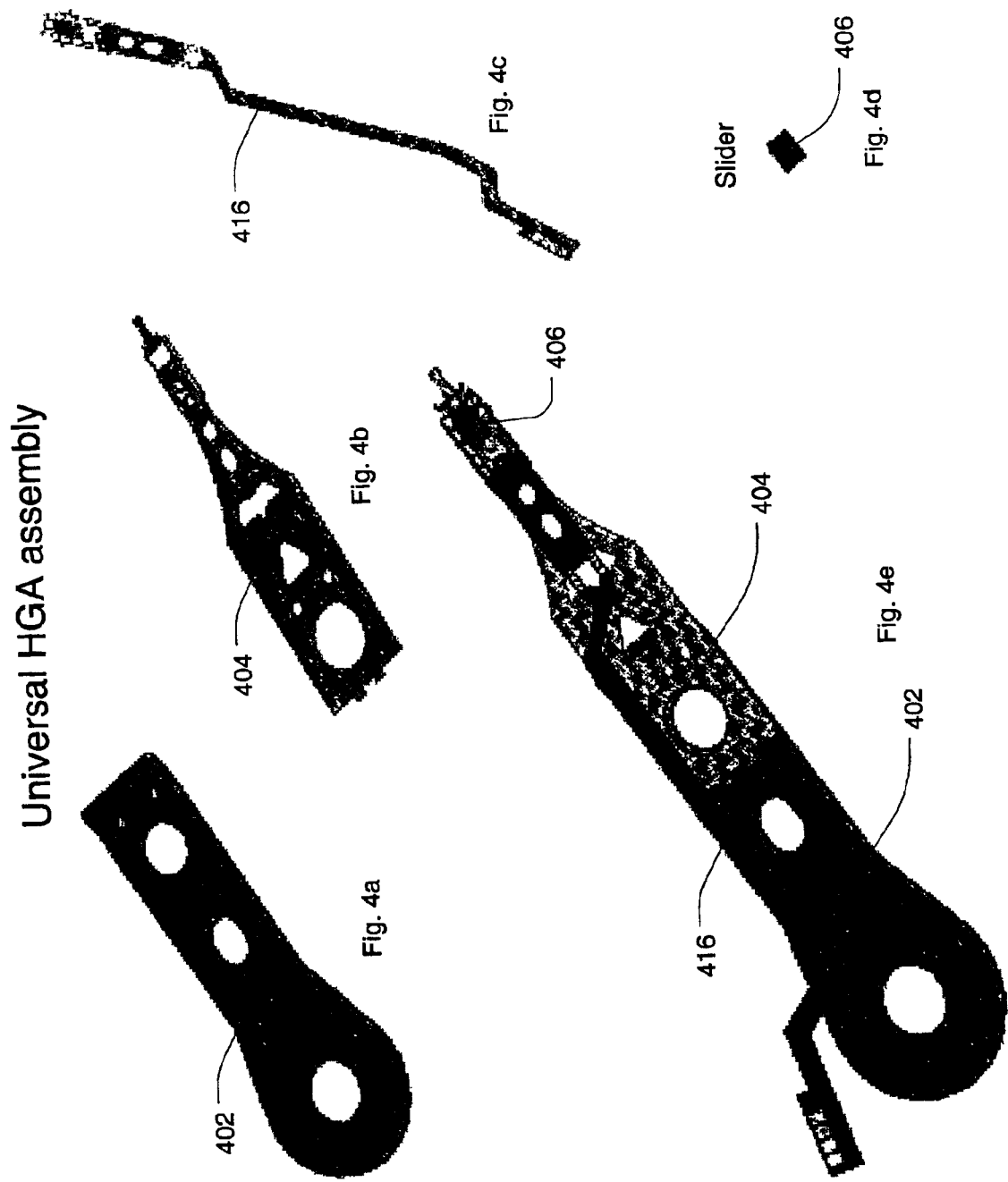

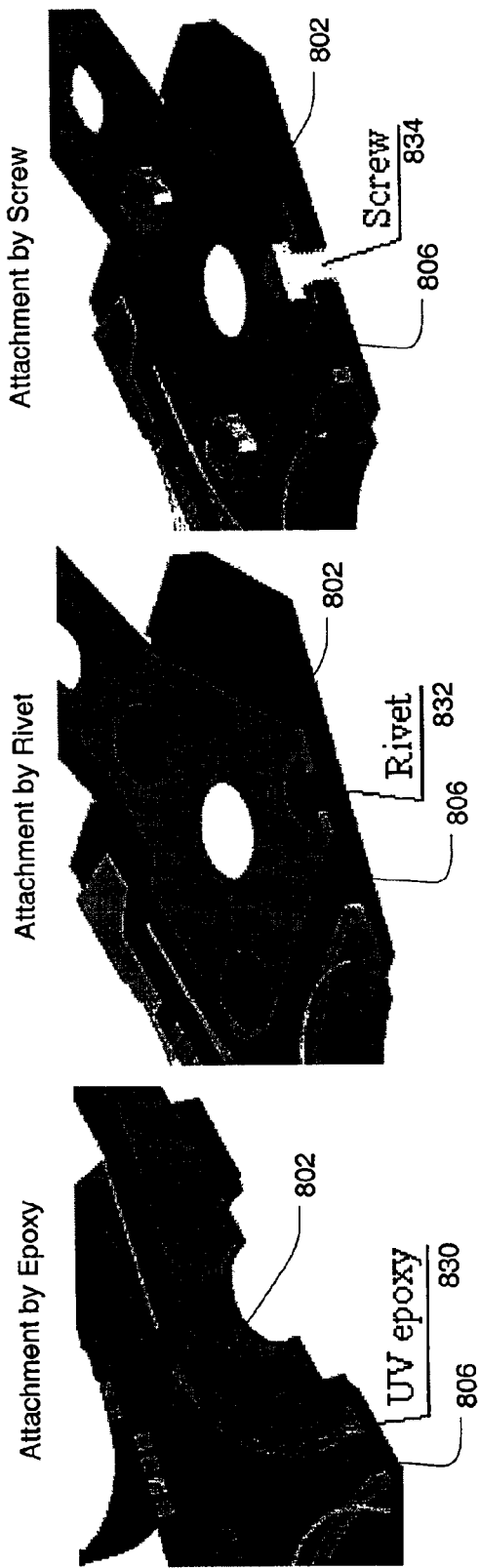

SYSTEM AND METHOD FOR A THREE-PIECE DESIGN OF A MAGNETIC HEAD ASSEMBLY

BACKGROUND INFORMATION

The present invention relates to magnetic hard disk drives. More specifically, the present invention relates to a system for an improved magnetic head arm assembly (HAA).

Among the better known data storage devices are magnetic disk drives of the type in which a magnetic head slider assembly floats on an air bearing at the surface of a rotating magnetic disk. Such disk drives are often called 'Winchester'-type drives. In these, one or more rigid magnetic disks are located within a sealed chamber together with one or more magnetic head slider assemblies. The magnetic disk drive may include one or more rigid magnetic disks, and the slider assemblies may be positioned at one or both sides of the magnetic disks.

Typically, each magnetic head slider assembly in magnetic disk drives of the type referred to is coupled to the outer end of an arm or load beam. FIG. 1 provides a top view of a typical magnetic head arm (HAA) base plate. The slider assembly 102 is mounted in a manner which permits gimbaled movement at the free outer end of the arm 106 such that an air bearing between the slider assembly 102 and the surface of the magnetic disk can be established and maintained. The elongated arm is coupled to an appropriate mechanism, such as a voice-coil motor (VCM) 104, for moving the arm 106 across the surface of the disk so that a magnetic head contained within the slider assembly 102 can address specific concentric data tracks on the disk for writing information on to or reading information from the data tracks.

An example of an HAA 108 having a gimbaled mount for a magnetic head slider assembly 102 is provided by U.S. Pat. No. 3,931,641 of Watrous. The HAA 108 described in the Watrous patent includes a relatively rigid load beam (arm) 106 having a rigid bearing member at a free outer end thereof for receiving a protuberance on a spring element. The spring element is spot welded to the load beam and has an end thereof defining a flexure. The flexure includes a pair of stiff crosslegs mounted on an opposite pair of flexible outer fingers and a central finger. The central finger mounts a magnetic head slider assembly, and gimbaled movement is provided by the load protuberance on the spring element that is held in contact with the bearing member at the end of the rigid load beam. Such arrangements provide desired gimballing action by allowing pitch and roll of the slider assembly around mutually orthogonal axes while resisting radial, circumferential, and yaw motions. Other patents, such as U.S. Pat. No. 3,931,641, No. 4,620,251, No. 4,796,122, and No. 5,313,353, describe other HAA designs.

FIG. 1 is representative of these designs, which are typical in the art. The slider 102 is potted to the HAA suspension and the head gimbal assembly (HGA) 110. The HGA 110 connects to the arm 106 through a ball stacking process (See FIG. 2). A flexible printed circuit (FPC) is bonded to the arm 106 by solder. Further, a rotational bearing 114 is screwed to an arm bearing hole, and the voice coil motor (VCM) 104 is glued to the arm 106 by epoxy.

FIG. 2 illustrates a typical process of ball stacking for the purpose of securing the HGA 210 to the arm 206 and the problem of stress and warpage due to said process. As seen in FIG. 2a, to secure the HGA 210 to the arm 206, the HGA 210 is located such that a raised portion 212 of the ball stacking assembly (of the HGA 210) is inserted into an opening 214 in the arm 206. A swag ball 216 is inserted into a ball-stacking hole 218 (See 118, FIG. 1). Then the swag ball 216 is forced 220 downward into the ball-stacking hole 218. Because the middle diameter of the ball-stacking hole 218 is less than that of the swag ball 216, the walls of the raised portion 212 are expanded as the swag ball 216 enters. This expansion causes forced contact between the outer walls of the raised portion 212 and the inner walls of the opening 214, securing the HGA 210 to the arm 206.

Although ball stacking works well to secure the HGA 210 to the arm 206, the deformations to the HGA 210 and arm 206 adversely affect the gram load of the HGA. FIG. 2b illustrates the deformation and residual stress experienced by the HGA 210 and the arm 206.

Many problems exist with the described designs typical in the art. In addition to the problem of the gram load change occurring after ball stacking, a problem is suspension/arm/coil motion independence. Motion tolerance between the components is often too great because of play involved in the securing means between the components.

Because of the strict dimensional parameters needed for implementation of ball-stacking, improper (too large) tolerance may lead to one or more negative consequences. For example, HGA 210 and arm 206 may be seriously deformed leaving a great amount of residual stress. As a result, the load-gram pitch/roll performance of HGA 210 after ball-stacking may become fairly poor. As another negative consequence, with even a small amount of deformation and residual stress, the assembly is more likely to come apart under usage, reducing reliability.

Further, if the HGA 210 is secured to arm 206 by ball stacking, it is possible that a large amount of torque would be necessary for component separation. A large amount of torque could damage the components. By contrast, if the torque requirement is too low, the device may come apart when not desired, such as during operation.

Because of the motion independence and HGA/arm deformation due to ball stacking, correct head alignment is difficult. Further, the typical method of design and manufacture for such HAA's is complicated and expensive, and the re-work process is difficult as well.

It is therefore desirable to have a system and method for an improved magnetic head arm assembly (HAA) that avoids the above-mentioned problems, in addition to other advantages.

BRIEF DESCRIPTION OF THE DRAWINGS

FIGS. 3a–d provide a illustrations of the components of a three-piece magnetic head and their assembly according to principles of the present invention.

FIGS. 4a–e provides an illustration of the components of a universal (unimount) HGA assembly and their assembly according to principles of the present invention.

FIG. 8 illustrates methods for securing the unimount HGA assembly to the actuator coil assembly.

DETAILED DESCRIPTION

Figure 1:
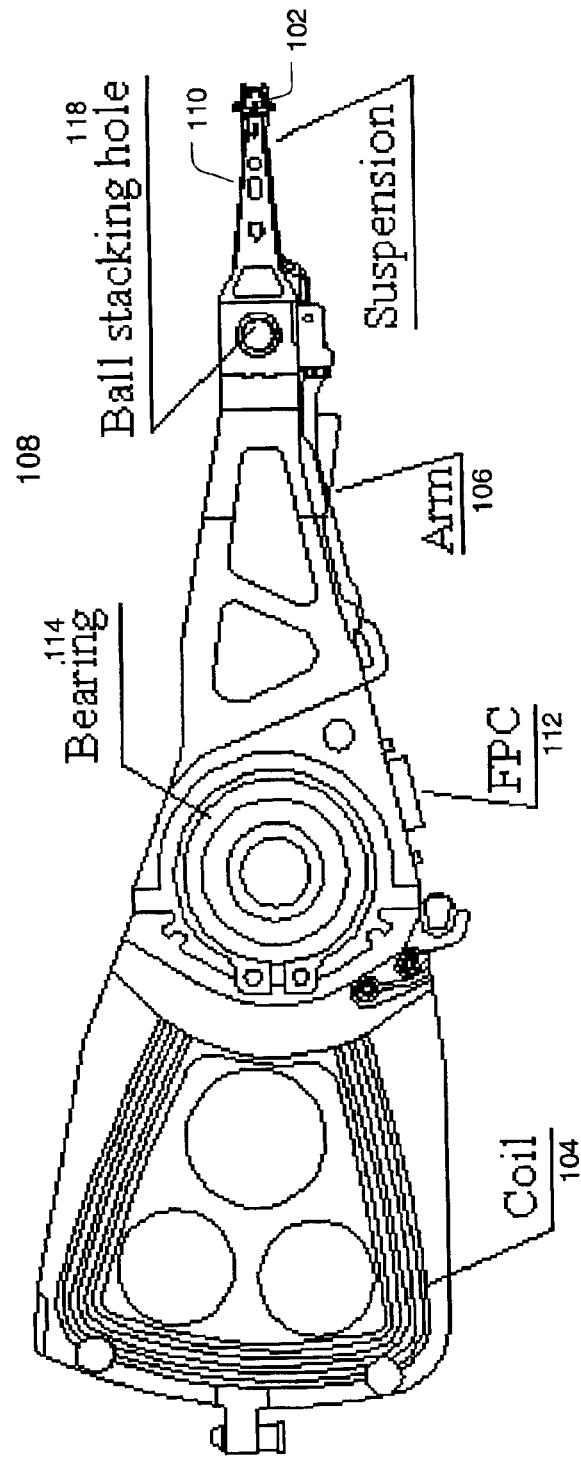
FIG. 1 provides a top view of a typical magnetic head arm assembly.
Figure 2A:
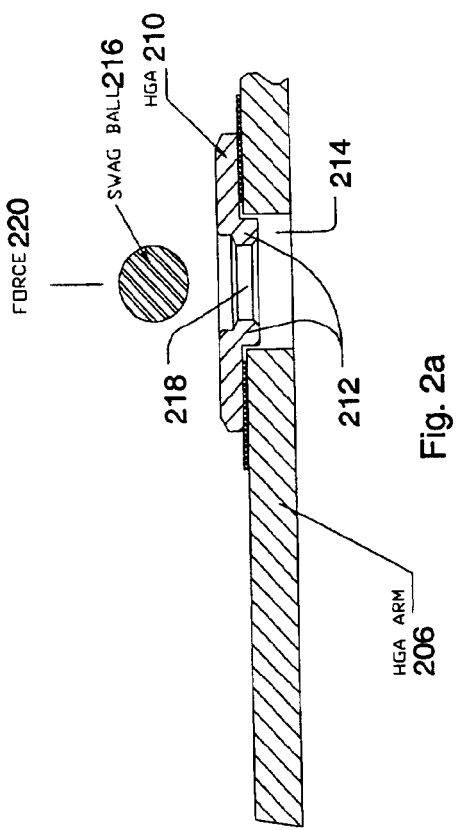
FIG. 2 illustrates a typical process of ball stacking for the purpose of securing the HGA to the arm and the problem of stress and warpage due to said process.
Figure 2B:
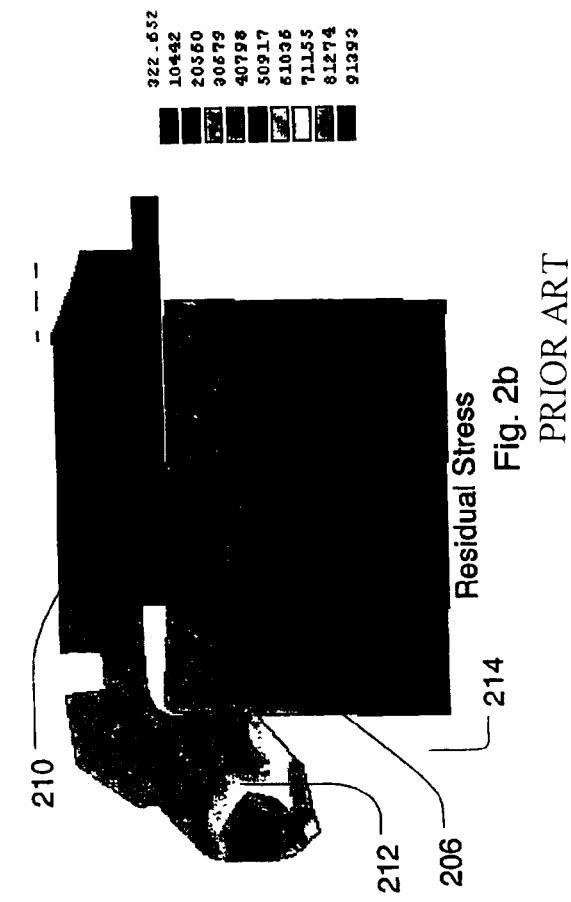

FIGS. 3a–d provide a illustrations of the components of a three-piece magnetic head and their assembly according to principles of the present invention. In an embodiment, the first of three pieces is a unimount head gimbal assembly (HGA) 302; the second piece is a flexible printed circuit (FPC) assembly 304; and the third piece is an actuator coil assembly 306.

In an embodiment, the FPC assembly 304 is secured to the actuator coil assembly 306. For this securement, a part of the FPC (the FPC mating portion) 314 is attached to the actuator body 310 at an actuator mating portion (second actuator mating portion) 318 by rivet deformation. Adhesive bonding and solder bonding are each alternative embodiments. Also for this securement, in an embodiment, a coil 312 is attached to an FPC trace by solder bonding. Stitch bonding is also an alternative embodiment. (See FIG. 7). In an embodiment, the interface surfaces of the mating portions 314,318 are flat and smooth to aid bonding with materials such as adhesive, solder, etc. Further, having flat, smooth mating surfaces of non-complex contours simplifies the process of designing and manufacturing each of the components of the three-piece magnetic head assembly independently of each other. As long as the mating portions match up, the components can be coupled together.

In an embodiment, the unimount HGA assembly 302 is secured at an HGA mating portion 320 to a first mating portion 322 of the actuator coil assembly 306. In one embodiment, this is done by adhesive bonding. Rivet deformation and screw mounting bonding are each alternative embodiments. (See FIG. 8). As above, in an embodiment, the interface surfaces of the mating portions 320,322 are flat and smooth to aid bonding with materials such as adhesive, solder, etc. Further, having flat, smooth mating surfaces of non-complex contours simplifies the process of designing and manufacturing each of the components of the three-piece magnetic head assembly independently of each other. As stated, as long as the mating portions match up, the components can be coupled. Accordingly, mating portions 314, 318, 320, and 322 can be referred to as "universal" in that they are designed to interface with a variety of differently designed and manufactured components.

In an embodiment, the unimount HGA assembly 302 is secured to the FPC assembly 304. For this securement, in an embodiment, a flex-suspension assembly (FSA) 316 is attached to an FPC bonding pad 318 by tape automated bonding (TAB). Anisotropic conductive film (ACF) bonding is envisioned for an alternative embodiment.

FIGS. 4*a*–*e* provides an illustration of the components of a universal (unimount) HGA assembly and their assembly according to principles of the present invention. In an embodiment, the first component is a unimount baseplate 402. Second, in an embodiment, is a multi-piece loadbeam 404. Third, in an embodiment, is an FSA trace 416. And fourth, in an embodiment, is a slider 406.

In an embodiment, the multi-piece loadbeam 404 is secured to the unimount baseplate 402 by laser welding. Also, in an embodiment, the FSA trace 416 is secured to the HGA assembly (unimount baseplate 402 and the multi-piece loadbeam 404) by ultra-violet (UV) epoxy bonding. Utilizing these methods of securement prevents the residual stress and deformation problems of ball stacking (swaging). The slider 406 is attached to the assembly, thereafter.

Figure 5:
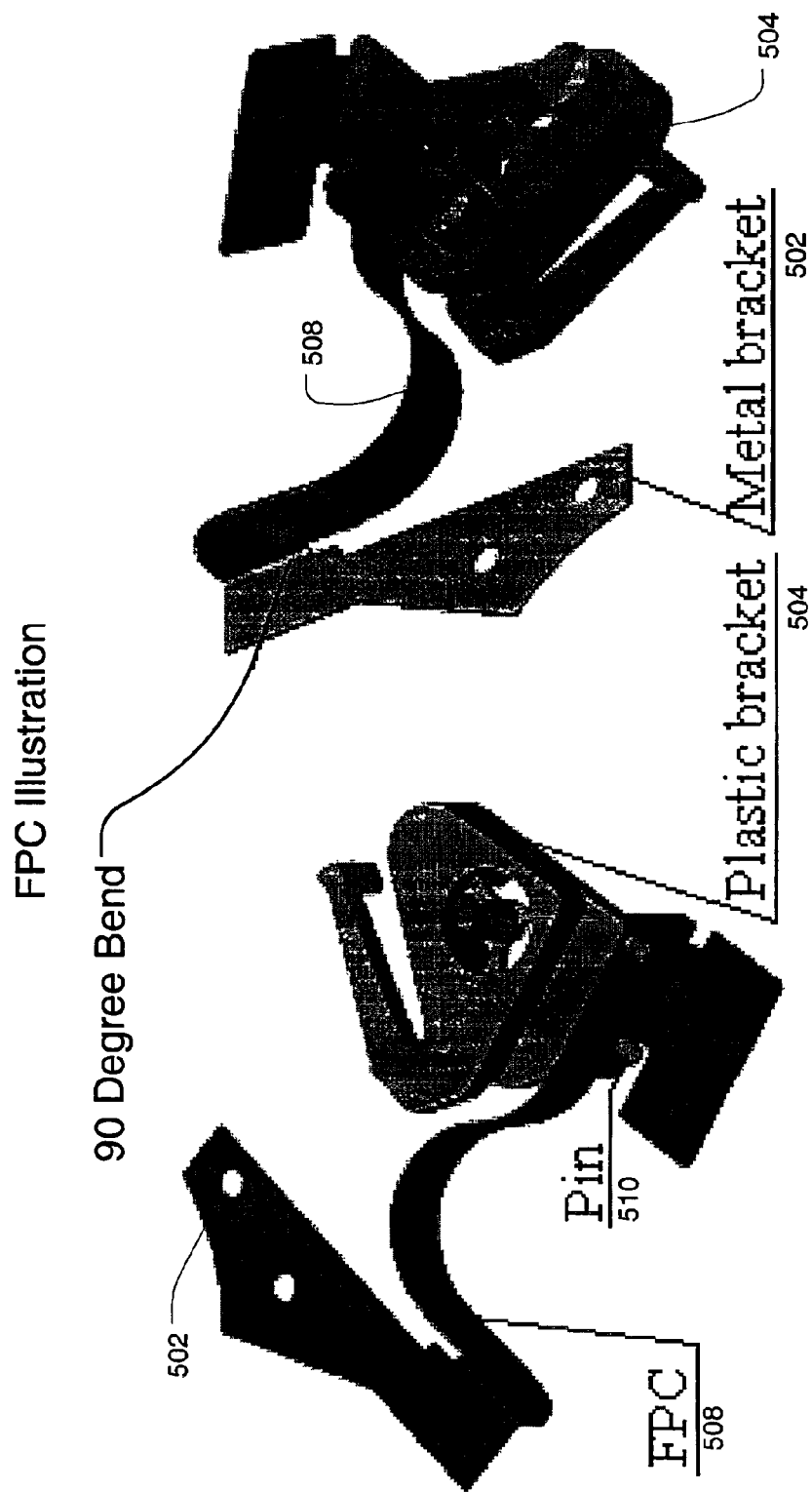
FIG. 5 provides an illustration of the components of an FPC assembly according to principles of the present invention.

FIG. 5 provides an illustration of the components of an FPC assembly according to principles of the present invention. In an embodiment, a metal bracket 502 is attached to one end of the FPC 508 by lamination. In an embodiment, a plastic bracket 504 is attached to the opposite end of the FPC 508 by pin 510 insertion.

Figure 6:
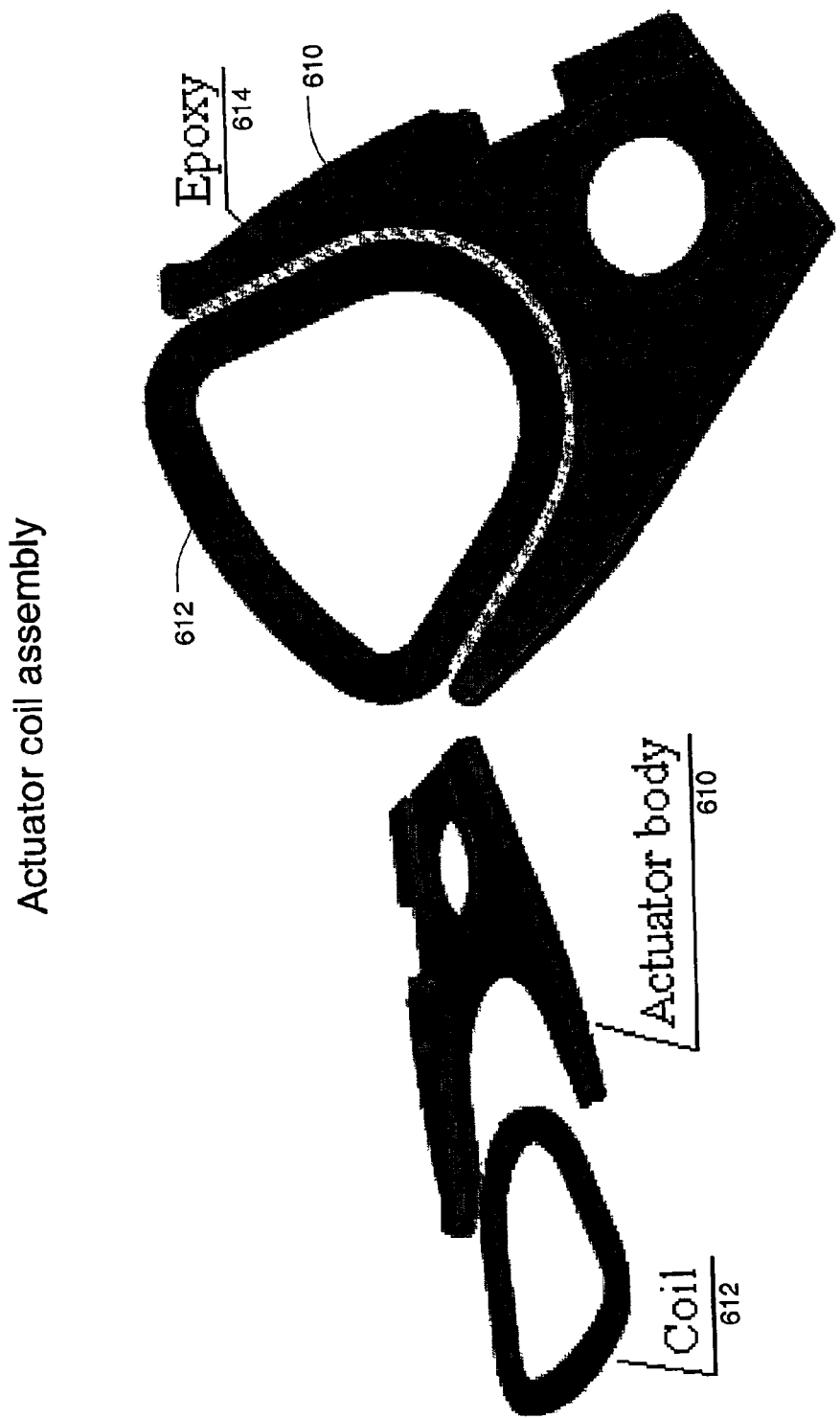
FIG. 6 provides an illustration of the components of an actuator coil assembly according to principles of the present invention.

FIG. 6 provides an illustration of the components of an actuator coil assembly according to principles of the present invention. In an embodiment, the coil 612 is attached to the actuator body 610 by epoxy 614.

Figure 7:
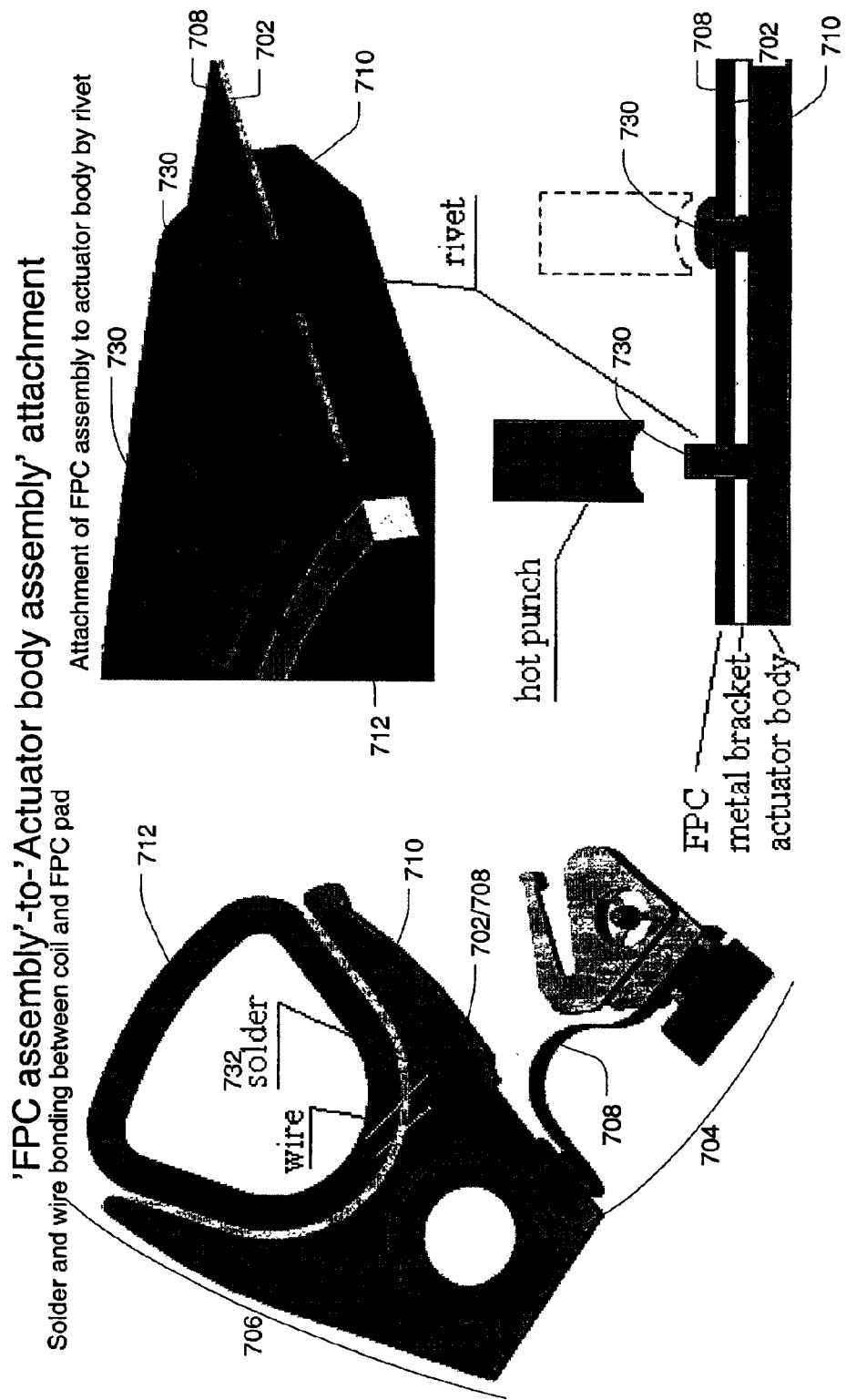
FIG. 7 illustrates methods for securing the FPC assembly to the actuator coil assembly.

FIG. 7 illustrates methods for securing the FPC assembly 304 to the actuator coil assembly 706. As stated, in an embodiment, the FPC 708 is attached to the actuator body 710 by rivet 730 deformation. As stated, in an embodiment, the coil 712 is attached to the FPC 708 by solder 732 bonding.

FIG. 8 illustrates methods for securing the unimount HGA assembly 802 to the actuator coil assembly 806. In one embodiment, this is done by ultra-violet (UV) epoxy 830. In another embodiment, this is done by rivet 832 deformation. In another embodiment, this is done by screw 834 mounting.

Although several embodiments are specifically illustrated and described herein, it will be appreciated that modifications and variations of the present invention are covered by the above teachings and within the purview of the appended claims without departing from the spirit and intended scope of the invention.

We claim:

1. A system for a magnetic head arm assembly (HAA) comprising:
    a head gimbal assembly (HGA) with an HGA mating portion;
    a flexible printed circuit (FPC) assembly with an FPC mating portion; and
    an actuator coil assembly with a first mating portion and a second mating portion;
wherein
    each of said HGA, said FPC assembly, and said actuator coil assembly being manufactured independent of one another;
    said actuator coil assembly first mating portion is contoured and recessed to interface with said HGA mating portion; and
    said actuator coil assembly second mating portion is contoured to interface with said FPC mating portion.

2. The system of claim 1, wherein said actuator coil assembly first mating portion and second mating portion each have substantially smooth interface surfaces, and wherein said HGA mating portion and FPC mating portion each have substantially smooth interface surfaces.

3. The system of claim 2, wherein said actuator coil assembly first mating portion and second mating portion each have substantially flat interface surfaces, and wherein said HGA mating portion and FPC mating portion each have substantially flat interface surfaces.

4. The system of claim 3, wherein said HGA is a unimount HGA.

5. The system of claim 4, wherein at least one of said HGA, said FPC assembly, and said actuator coil assembly is manufactured by injection molding.

6. The system of claim 5, wherein said unimount HGA includes a unimount baseplate containing said HGA mating portion, a multi-piece loadbeam, a flex-suspension assembly (FSA) trace, and a slider device.

7. The system of claim 6, wherein said FPC assembly includes a plastic bracket, a metal bracket containing said FPC mating portion, and a flexible printed circuit.

8. The system of claim 7, wherein said actuator coil assembly includes a coil and an actuator body containing said first and second mating portions.

* * * * *